United States Patent Office 2,766,178
Patented Oct. 9, 1956

2,766,178

METHOD OF REMOVING NITROGEN BASES FROM HYDROCARBON OILS BY TREATMENT WITH AN ORGANIC BASE EXCHANGE RESIN

Warren W. Johnstone, Riverside, Ill., assignor to Universal Oil Products Company, Chicago, Ill., a corporation of Delaware No Drawing. Application August 20, 1948,
Serial No. 45,441

10 Claims. (Cl. 196—23)

This invention relates to a process for treating hydrocarbon oils to remove basic organic compounds present therein as contaminants. More specifically, the process is concerned with a method of removing basic organic nitrogen compounds from cracked hydrocarbon fractions and particularly from cracked gasolines such as California cracked gasoline.

An object of this invention is to remove basic organic compounds from hydrocarbon oils.

Another object of this invention is to remove basic organic nitrogen compounds from cracked gasoline.

One specific embodiment of this invention relates to a process for treating hydrocarbon oils to remove basic organic contaminants which comprises contacting said hydrocarbon oil with a cation exchange resin and recovering the treated oil.

Another embodiment of this invention relates to a process for removing basic organic nitrogen compounds from a gasoline contaminated thereby which comprises passing said gasoline through a bed of a cation exchange resin and recovering the treated gasoline.

Nearly all petroleums contain combined nitrogen although usually in small quantities. However, certain crude petroleums have a high nitrogen content, such as certain California oils. The constituents of these nitrogen compounds are not known very clearly because of the fact that the compounds are decomposed during distillation and converted largely into basic materials with the characteristics of pyridine, quinoline, and other basic organic compounds. Many of these basic compounds are objectionable in cracked gasoline as they have disagreeable odors and some cause the development of a reddish color in the gasoline or other hydrocarbon fraction containing them.

By this process, the basic organic nitrogen compounds which are present in some petroleum fractions and particularly in cracked hydrocarbon fractions can be removed from said hydrocarbon fractions and also can be recovered in a highly concentrated form which has been found suitable for use as a soil sterilization agent, as an insecticide, and the like.

The treating agents used in this process for removing basic organic nitrogen compounds from hydrocarbon fractions contaminated thereby comprise essentially a cation exchange resin of the type employed heretofore in water purification, in the refining of sugar syrups, and the like. Cation exchange resins that are particularly active in this process comprise condensation products of phenols and polyhydric phenols with formaldehyde in which have been incorporated strongly acid groups such as alkyl sulfonic acids and aryl sulfonic acids. This may be done by effecting a condensation of the phenolic material with formaldehyde and sodium sulfite whereby ethylene sulfonic acid groups were introduced, or by a condensation of sulfonic acids of aromatic hydroxyl compounds with formaldehyde.

This process is carried out either as a batch-type operation or preferably as a continuous type of operation.

In batch treatment, the hydrocarbon containing basic organic nitrogen compounds is contacted with the cation exchange resin in a reactor provided with a stirrer or other mixing device and then the treated oil is separated from the resin by decantation, filtering, or other suitable means.

In the preferred continuous-type of operation, the hydrocarbon material being treated is passed through a bed of a cation exchange resin contained in a suitable reactor and maintained at a temperature of from about 40° to about 140° F. Thus the liquid hydrocarbon may be passed or percolated downwardly through a vertical bed of the resin. When the batch of resin has become spent, that is, when it no longer combines with basic organic nitrogen compounds, the used resin may be washed with a dilute aqueous solution of a mineral acid such as sulfuric acid to regenerate the base-removing properties of the resin.

The following numerical data are given to illustrate the process of this invention although with no intention of limiting unduly the generally broad scope of the invention.

Example I

California cracked gasoline and pressure distillate were passed through a bed of cation exchange resin (Amberlite IR–100) at 70° F. and at atmospheric pressure with the results shown in the following table.

TABLE

*Nitrogen content of untreated and treated samples of California raw stabilized pressure distillate and plant doctor treated heavy pressure distillate*

| Sample | Treatment | Liquid Hourly Space Velocity | Nitrogen Content, Percent | Color |
|---|---|---|---|---|
| Raw stabilized pressure distillate. | None | | 0.014 | Maroon. |
| Do | Through cation exchange resin. | 4.5 | 0.0069 | Do. |
| Do | Through cation exchange resin.[a] | 7.5 | 0.0098 | Amber. |
| Do | Through cation exchange resin.[b] | 7.5 | 0.0007 | Do. |
| Plant doctor treated heavy pressure distillate. | None | | 0.0143 | Do. |
| Do | Through cation exchange resin.[b] | 9.0 | 0.0127 | Do. |

[a] Washed with 10% of 40° Bé. sodium hydroxide solution.
[b] Washed with 3% of 4° Bé. sodium hydroxide solution.

Example II

Using a liquid hourly space velocity of 6.3, a 1% by weight solution of pyridine in Pennsylvania cracked gasoline was percolated over Amberlite IR–100 cation exchange resin in three consecutive runs. Analysis of the treated gasoline showed that 14.3, 15.6, and 15.9 percent respectively of the pyridine was removed from the gasoline in these three percolations.

Other percolation tests through fresh samples of the above cation exchange resin were made at different charging rates with only one percolation being made for each liquid hourly space velocity. The above-mentioned Pennsylvania cracked gasoline containing 0.127% by weight of pyridine was charged in each of these tests with the results given in the following table.

| Liquid hourly space velocity | 5.5 | 2.0 | 1.3 |
|---|---|---|---|
| Percent Pyridine removed | 13.5 | 27.6 | 36.3 |

The resin that had been used in the test at 1.3 liquid hourly space velocity with 36.3% of pyridine removal was washed with an 80% aqueous solution of sulfuric acid. The resin decreased about 20 percent in volume and the acid became dark. By analysis, it was found that the sulfuric acid removed about 80% of the pyridine from the resin. The acid treated resin was used again to remove pyridine from the gasoline. The percent pyridine removed was 14 at 1.3 liquid hourly space velocity.

In another run the cation exchange resin was soaked in water before use. In this run 74.5 per cent of the pyridine was removed from 0.1% pyridine solution in Pennsylvania cracked gasoline charged at a liquid hourly space velocity of 1.0

I claim as my invention:

1. A process for removing basic organic nitrogen compounds from hydrocarbon oils containing the same which comprises contacting the oil with a water-treated sulfonated phenol-formaldehyde resin, and recovering the treated oil.

2. A process for removing basic organic nitrogen compounds from hydrocarbon oils containing the same which comprises passing the oil at a temperature of from about 40° to about 140° F. through a bed of a water-treated sulfonated phenol-formaldehyde resin, and recovering the treated oil.

3. The process of claim 1 further characterized in that the hydrocarbon oil comprises gasoline.

4. A process for removing basic organic nitrogen compounds from hydrocarbon oils containing the same which comprises contacting the oil with a sulfonated phenol-formaldehyde resin which has been soaked in water prior to use in the process, and recovering the treated oil.

5. The process of claim 4 further characterized in that the hydrocarbon oil comprises gasoline.

6. In the process of purifying oils containing basic nitrogenous contaminants, the step which comprises subjecting such an oil in liquid phase to contact in the presence of water with an organic base exchange resin, and separating the thus contacted oil from the resin.

7. The process of claim 6 further characterized in that said oil comprises cracked gasoline.

8. A process for removing basic organic nitrogen compounds from hydrocarbon oils containing the same which comprises contacting the oil with a cation exchange resin which has been soaked in water prior to use in the process, and recovering the treated oil.

9. The process of claim 8 further characterized in that the hydrocarbon oil comprises cracked gasoline.

10. The process of claim 6 further characterized in that said resin is a sulfonated phenol-formaldehyde resin.

References Cited in the file of this patent

UNITED STATES PATENTS

| | | |
|---|---|---|
| 2,338,371 | Workman | Jan. 4, 1944 |
| 2,367,803 | Schindler | Jan. 23, 1945 |
| 2,432,644 | Alther | Dec. 16, 1947 |
| 2,455,282 | Thurston | Nov. 30, 1948 |
| 2,566,353 | Mills | Sept. 4, 1951 |